US008843683B2

(12) United States Patent
Madukkarumukumana et al.

(10) Patent No.: US 8,843,683 B2
(45) Date of Patent: *Sep. 23, 2014

(54) POSTING INTERRUPTS TO VIRTUAL PROCESSORS

(71) Applicant: Intel Corporation, Santa Clara, CA (US)

(72) Inventors: Rajesh Sankaran Madukkarumukumana, Portland, OR (US); Gilbert Neiger, Portland, OR (US); Ohad Falik, Kfar Saba (IL); Sridhar Muthrasanallur, Puyallup, WA (US); Gideon Gerzon, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/837,730

(22) Filed: Mar. 15, 2013

(65) Prior Publication Data

US 2013/0232288 A1    Sep. 5, 2013

Related U.S. Application Data

(63) Continuation of application No. 12/650,581, filed on Dec. 31, 2009, now Pat. No. 8,566,492.

(51) Int. Cl.
*G06F 13/24* (2006.01)

(52) U.S. Cl.
CPC ..................................... *G06F 13/24* (2013.01)
USPC ............ 710/260; 710/269; 718/102; 718/108

(58) Field of Classification Search
USPC .......................... 710/260–269; 718/102, 108
See application file for complete search history.

(56) References Cited

U.S. PATENT DOCUMENTS

| | | | | |
|---|---|---|---|---|
| 4,658,351 A | * | 4/1987 | Teng | 718/103 |
| 5,283,904 A | * | 2/1994 | Carson et al. | 710/266 |
| 5,530,891 A | * | 6/1996 | Gephardt | 710/8 |
| 5,727,217 A | * | 3/1998 | Young | 710/260 |
| 5,727,219 A | * | 3/1998 | Lyon et al. | 710/268 |
| 6,219,743 B1 | * | 4/2001 | Kennel et al. | 710/260 |
| 7,000,051 B2 | * | 2/2006 | Armstrong et al. | 710/267 |
| 7,048,877 B2 | * | 5/2006 | Zimmer et al. | 710/260 |
| 7,054,974 B2 | * | 5/2006 | Quach et al. | 710/260 |
| 7,209,994 B1 | * | 4/2007 | Klaiber et al. | 710/264 |
| 7,222,203 B2 | * | 5/2007 | Madukkarumukumana et al. | 710/260 |
| 7,237,051 B2 | * | 6/2007 | Bennett et al. | 710/260 |
| 7,281,075 B2 | * | 10/2007 | Armstrong et al. | 710/267 |
| 7,287,197 B2 | * | 10/2007 | Bennett et al. | 714/48 |

(Continued)

OTHER PUBLICATIONS

Intel Corporation. Intel Virtualization Technology for Directed I/O. Architecture Specification. Sep. 2013.*

(Continued)

*Primary Examiner* — Matthew D Spittle
(74) *Attorney, Agent, or Firm* — Thomas R. Lane

(57) ABSTRACT

Embodiments of systems, apparatuses, and methods for posting interrupts to virtual processors are disclosed. In one embodiment, an apparatus includes look-up logic and posting logic. The look-up logic is to look-up an entry associated with an interrupt request to a virtual processor in a data structure. The posting logic is to post the interrupt request in a data structure specified by information in the first data structure.

9 Claims, 10 Drawing Sheets

(56) References Cited

U.S. PATENT DOCUMENTS

| | | | | |
|---|---|---|---|---|
| 7,630,967 | B1* | 12/2009 | Srivastava et al. | 1/1 |
| 7,689,747 | B2* | 3/2010 | Vega et al. | 710/261 |
| 7,702,835 | B2* | 4/2010 | Riethmuller | 710/260 |
| 7,707,341 | B1* | 4/2010 | Klaiber et al. | 710/244 |
| 8,055,827 | B2* | 11/2011 | Serebrin et al. | 710/260 |
| 8,103,815 | B2* | 1/2012 | Ganguly | 710/264 |
| 8,131,901 | B2* | 3/2012 | Mansell et al. | 710/260 |
| 8,180,944 | B2* | 5/2012 | Serebrin et al. | 710/269 |
| 8,234,432 | B2* | 7/2012 | Serebrin | 710/268 |
| 2007/0157197 | A1* | 7/2007 | Neiger et al. | 718/1 |
| 2008/0162762 | A1* | 7/2008 | Neiger et al. | 710/261 |
| 2010/0023666 | A1* | 1/2010 | Mansell et al. | 710/267 |
| 2011/0040914 | A1* | 2/2011 | Strauss et al. | 710/267 |

OTHER PUBLICATIONS

Uhlig et al. Intel Virtualization Technology. IEEE. 2005.*
Nakajima, Jun. Enabling Optimized Interrupt/APIC Virtualization in KVM. Nov. 8, 2012.*
Nakajima, Jun "Intel Virtualization Technology Roadmap and VT-d Support in Xen", Intel Open Source Technology Center, 2007.
Intel Corporation, "Enabling Intel Virtualization Technology Features and Benefits", White Paper, 2010.
Intel Corporation, "Intel Virtualization Technology for Directed I/O", Architecture Specification, Sep. 2007.

* cited by examiner

FIGURE 3
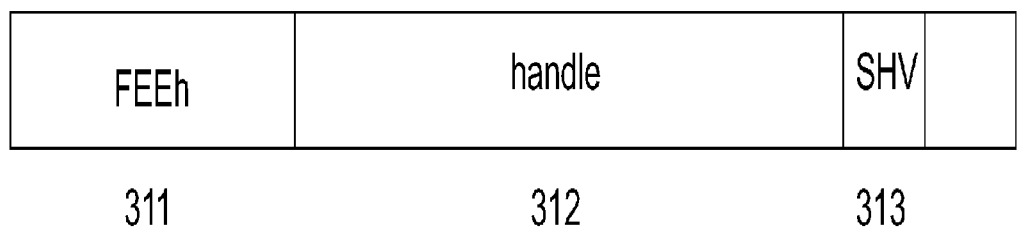
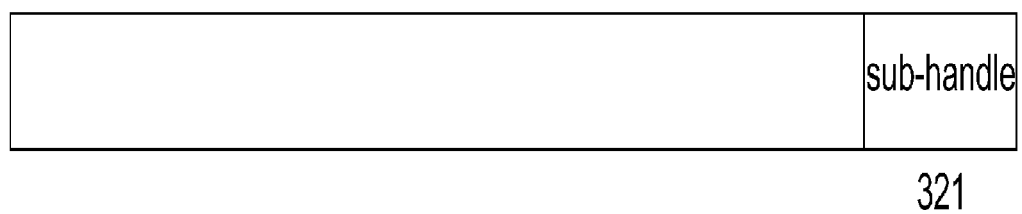

FIGURE 4    MSI register 152
Address Field 410
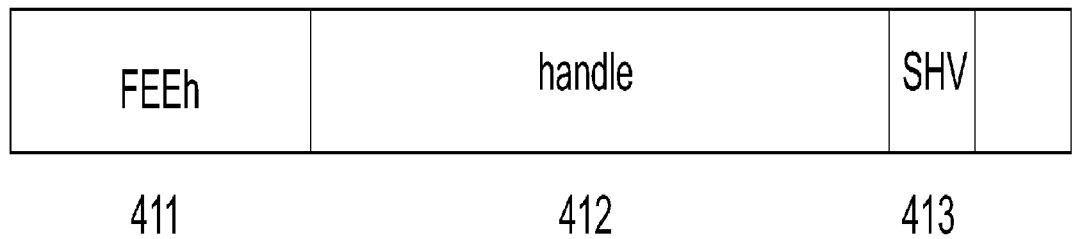
Data Field 420
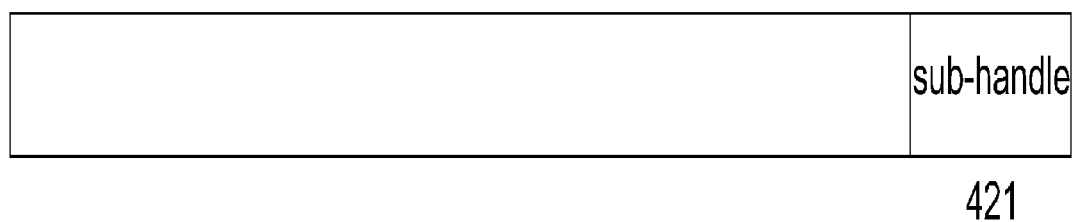

FIGURE 5
RT register 500
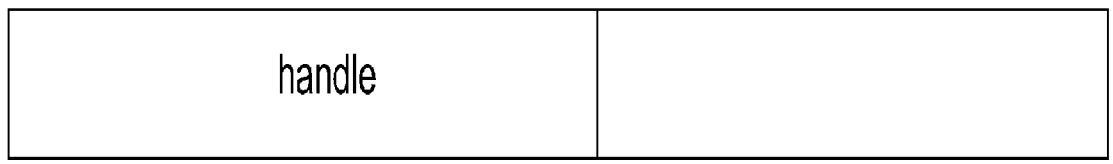
511
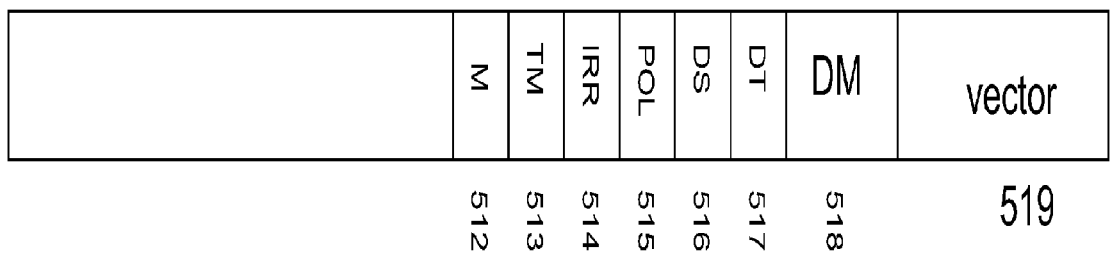

Posted-Interrupt Descriptor 700

METHOD 900

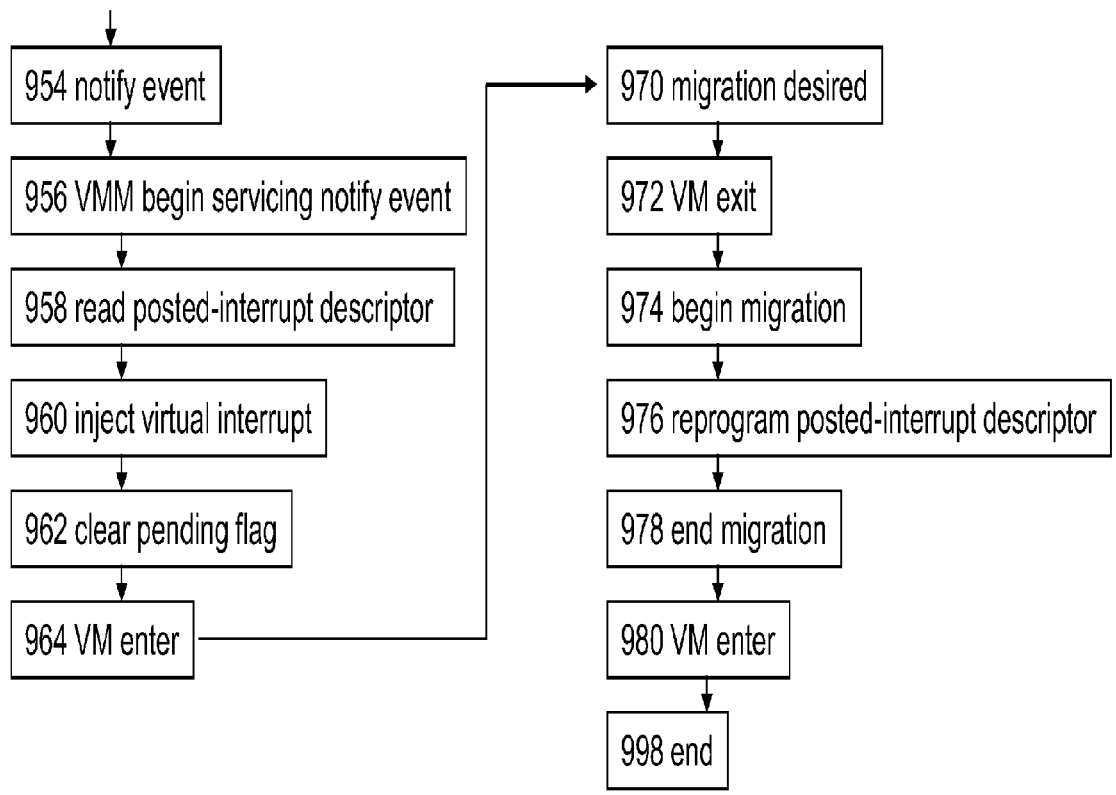

POSTING INTERRUPTS TO VIRTUAL PROCESSORS

CROSS REFERENCE TO RELATED APPLICATIONS

This application is a continuation of U.S. patent application Ser. No. 12/650,581, filed Dec. 31, 2009.

BACKGROUND

1. Field

The present disclosure pertains to the field of information processing, and more particularly, to the field of managing interrupts in an information processing system.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies (a "VM exit").

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies (a "VM exit").

Therefore, external interrupts may be intercepted by the VMM and routed to the appropriate virtual processor. Alternatively, a virtualization environment may provide for external interrupts to be routed to a virtual processor without a VM exit, for example, if the interrupt request is generated by an input/output ("I/O") device assigned to the currently active VM, or if the interrupt request is an inter-processor interrupt between two virtual processors in the same VM. Whether the interrupt request causes a VM exit or not, routing the interrupt to the appropriate virtual processor may include mapping interrupts requests from a guest's view of the system to a host's view of the system. In existing information processing systems, the VMM may be responsible for remapping interrupt requests whenever a virtual processor is migrated from one physical processor to another physical processor.

BRIEF DESCRIPTION OF THE DRAWINGS

The present invention is illustrated by way of example and not limitation in the accompanying figures.

FIG. 3 illustrates a message signaled interrupt format compatible with an embodiment of the present invention.

FIG. 4 illustrates a message signaled interrupt register format compatible with an embodiment of the present invention FIG. 5 illustrates an interrupt controller redirection table register format compatible with an embodiment of the present invention.

DETAILED DESCRIPTION

Figure 1:
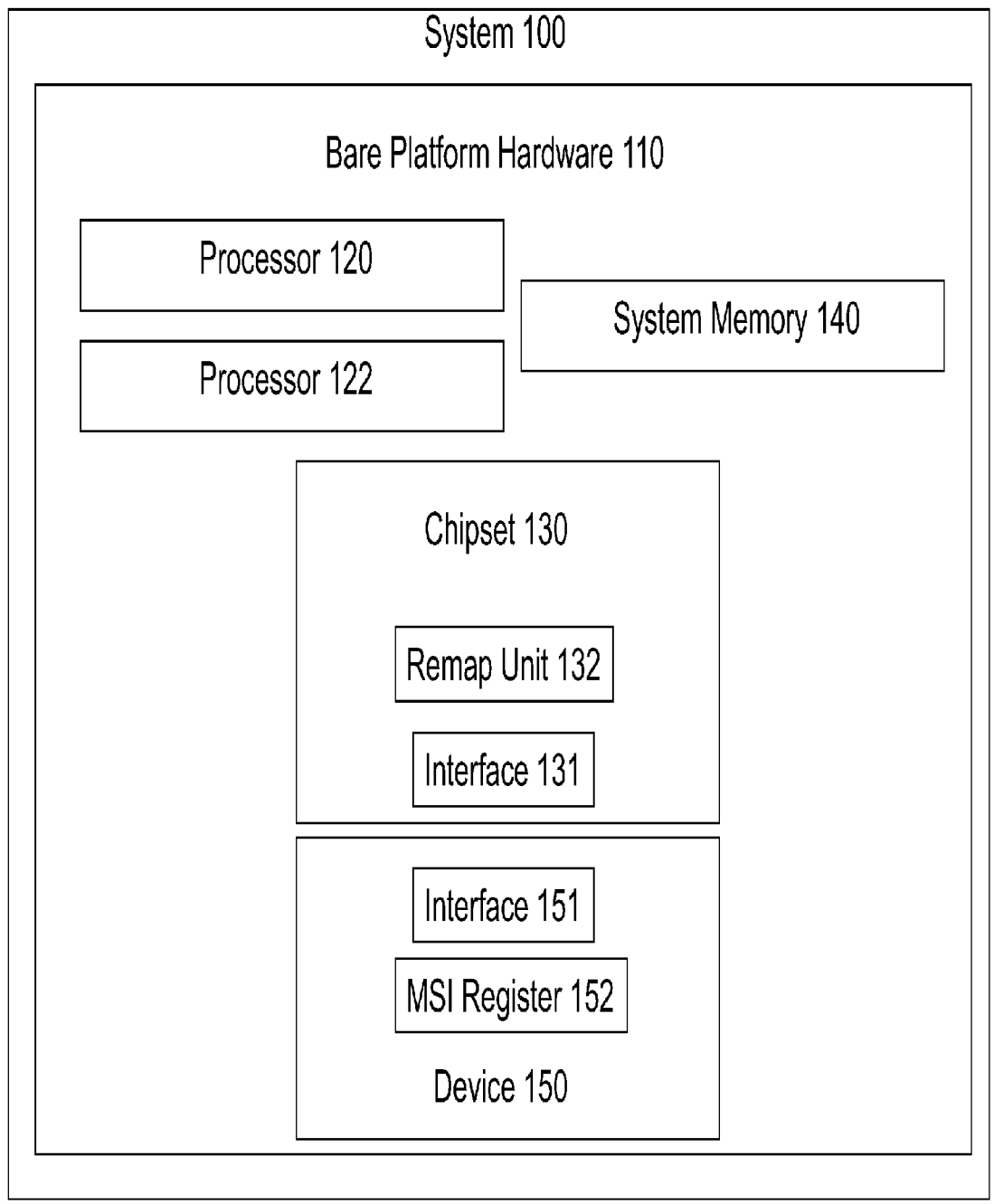
FIG. 1 illustrates an embodiment of the present invention in a system for posting interrupts to virtual processors.

The present invention may be embodied in systems, apparatuses, and methods for posting interrupts to virtual processors, as described below. In the description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention provide for posting, in a data structure in a memory, interrupt requests to virtual processors. Posting interrupt requests according to embodiments of the present invention may be desirable for several reasons.

First, as the number of physical processors and cores per system increases, the use of techniques for optimizing system performance and efficiency by migrating virtual processors among the physical processors and cores increases. Embodiments of the present invention may provide for these techniques to be less complex, by providing for all interrupt requests destined for a virtual processor to be migrated atomically.

Second, posting of interrupts according to embodiments of the present invention may provide for the delivery of external interrupts to a virtual processor to depend on the state of the virtual processor, potentially increasing system performance by reducing the number of VM exits. For example, an interrupt request for a virtual processor that is waiting for one of its quanta of time on a physical processor may be held pending in memory, without causing a VM exit, until the virtual processor is running.

Third, I/O device virtualization, for example as provided for the Peripheral Component Interconnect ("PCI") Express Single-Root I/O Virtualization Specification (available from http://www.pcisig.org), may provide for a single physical I/O device to be configured as multiple virtual I/O devices, each assignable to a different VM. Therefore, many more interrupt sources are possible in a virtualization environment than in a conventional system. To accommodate this possibility, embodiments of the present invention may provide for many more interrupt vectors than would be available in a prior art system, by supporting a virtual vector space for each virtual processor.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

FIG. 1 illustrates an embodiment of the present invention in information processing system 100. Information processing system 100 includes bare platform hardware 110, which may be any apparatus capable of executing any OS, VMM, or other software. For example, bare platform hardware 110 may be the hardware of a personal computer, a mainframe computer, a portable computer, a handheld device, a set-top box, a server, or any other computing system. In this embodiment, bare platform hardware 110 includes processors 120 and 122, chipset 130, system memory 140, and device 150.

Processors 120 and 122 may be any components having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows two processors, bare processing hardware 110 may include any number of processors, including any number of multicore processors, each with any number of execution cores, and any number of multithreaded processors, each with any number of threads.

Chipset 130 may be any group of circuits and logic that supports memory operations, input/output operations, configuration, control, internal or external interface, connection, or communications functions (e.g., "glue" logic and bus bridges), and/or any similar functions for processors 120 and 122 and/or system 100. Individual elements of chipset 130 may be grouped together on a single chip, a pair of chips, dispersed among multiple chips, and/or be integrated partially, totally, redundantly, or according to a distributed approach into one or more processors, including processors 120 and/or 122. In this embodiment, chipset 130 includes interrupt remapping unit 132 for remapping or posting interrupts according to an embodiment of the invention, as described below. In other embodiments, interrupt remapping unit 132 may be included elsewhere in system 100.

System memory 140 may be any medium on which information, such as data and/or program code, may be stored, such as static or dynamic random access memory, semiconductor-based read-only or flash memory, magnetic or optical disk memory, or any other type of medium readable by processors 120 and 122, or any combination of such mediums.

Device 150 may represent any type of I/O, peripheral, or other device that may be the source of an interrupt request, such as a keyboard, mouse, trackball, pointing device, monitor, printer, media card, network interface, information storage device, etc. Device 150 may be embodied in a discrete component, or may be included in an integrated component with any other devices. In one embodiment, device 150 may represent a function in a multifunctional I/O, peripheral, or other device.

Processors 120 and 122, chipset 130, system memory 140, and device 150 may be coupled to or communicate with each other according to any known approach, such as directly or indirectly through one or more parallel, sequential, pipelined, asynchronous, synchronous, wired, wireless, or other bus or point-to-point connection or means of communication. For example, in this embodiment chipset 130 includes interface 131 to receive signals, messages, and/or transactions, such as interrupt requests, from device 150, or transmit signals, messages, and/or transactions to device 150 and/or any other agents or components in system 100, through any such connection or other means of communication. Similarly, device 150 includes interface 151 to transmit and/or receive signals, messages, and/or transactions to chipset 130, and/or any other agents or components in system 100. System 100 may also include any number of additional agents, components, or connections.

Figure 2:
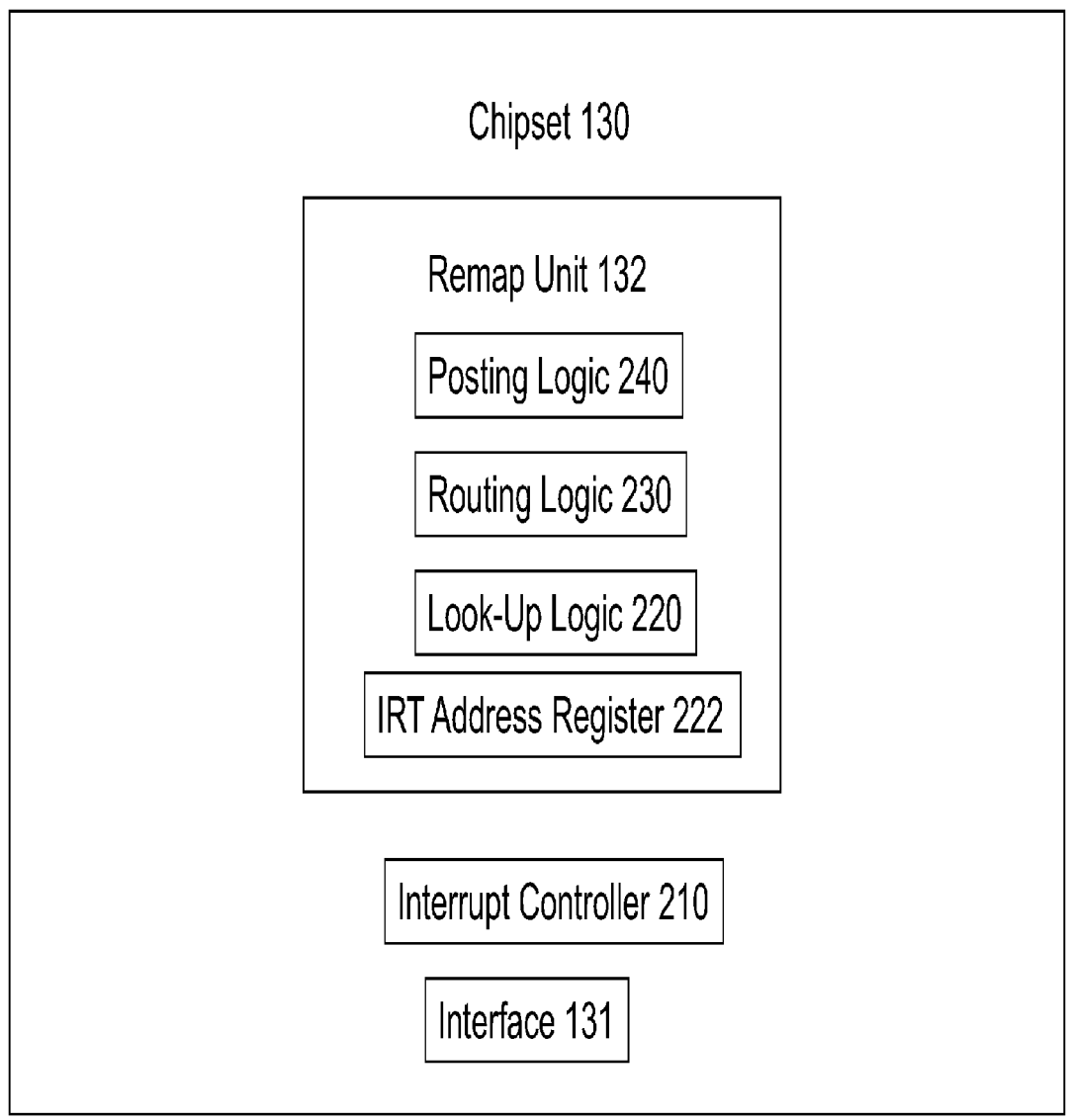
FIG. 2 illustrates an embodiment of the present invention in an apparatus for posting interrupts to virtual processors.

FIG. 2 illustrates chipset 130, including remapping unit 132, according to one embodiment of the present invention. Remapping unit 132 includes look-up logic 220, routing logic 230, and posting logic 240. Chipset 130 also includes interface 131, described above, and interrupt controller 210.

Chipset 130 may receive an interrupt request through interface 131. An interrupt request may also be generated from within chipset 130, for example where a timer or other device that may generate an interrupt is included in chipset 130. In one embodiment, an interrupt request may be received as a signal, such as a level or edge triggered interrupt signal, according to any known signaling protocol. In another embodiment, an interrupt request may be received as a message, such as a bus message or a point-to-point transaction, according to any known message, transaction, or other communication protocol. Other embodiments are possible, including an embodiment using both signal and message based interrupt requests. In such an embodiment, chipset 130 may receive both types of requests; signal based requests through input terminals and message based requests through write transactions to an address or port corresponding to a register or other storage location assigned to the interrupt controller.

Look-up logic 220 is to look up an entry associated with an interrupt request, e.g., from device 150, in a data structure. Look-up logic 220 may be implemented with any logical structure or circuitry that performs a function of looking up or finding an entry in a data structure. The entry may be found using a "handle" as an entry number, address, index, pointer, or other locator of or to a particular entry in the data structure, where the handle is a value supplied directly or indirectly by the interrupt request.

For example, according to a message signaled interrupt ("MSI") protocol of a PCI-Express bus, an interrupt message may include a 32-bit address field and a 32-bit data field, where bits 31:20 of the address field are set to the hexadecimal value "FEE" to indicate that the message is an interrupt request. The remaining bits of the fields may be used to indicate other information, such as the interrupt vector and the desired destination for the interrupt request. An embodiment of the present invention compatible with this protocol may use the formats shown in FIG. 3.

In FIG. 3, 32-bit address field 310 includes bit-fields 311, 312, and 313, and 32-bit data field 320 includes bit-field 321. Bit-field 311 may include bits 31:20 of address field 310, and may be set to the hexadecimal value "FEE" to indicate that the message is an interrupt request. Bit-field 312 may include bits 19:5 and bit 2 of address field 310, and may be used to indicate a 16-bit handle value. Bit-field 313 may include bit 3 of address field 310, and may be used to indicate a 1-bit sub-handle valid ("SHV") value. Bit-field 321 may include bits 15:0 of data field 320, and may be used to indicate a 16-bit sub-handle value. The use of the SHV and sub-handle values will be described below. The remaining bits of address field 310 and data field 320 may be treated as reserved or ignored.

In order to generate an MSI transaction in such a format, device 150, or any other device in system 100, including a device integrated into chipset 130, may include a register or other storage location such as MSI register 152, as shown in FIG. 4. MSI register 152 may include 32-bit address field 410 and 32-bit data field 420. Address field 410 includes bit-fields 411, 412, and 413, and data field 420 includes bit-field 421. Bit-field 411 may include bits 31:20 of address field 410, and may be set to the hexadecimal value "FEE" to indicate that the message is an interrupt request. Bit-field 412 may include bits 19:5 and bit 2 of address field 410, and may be used to indicate a 16-bit handle value. Bit-field 413 may include bit 3 of address field 410, and may be used to indicate a 1-bit sub-handle valid ("SHV") value. Bit-field 421 may include bits 15:0 of data field 420, and may be used to indicate a 16-bit sub-handle value. The use of the SHV and sub-handle values will be described below. The remaining bits of address field 410 and data field 420 may be treated as reserved or ignored.

In an embodiment where an interrupt request is sent as a signal, the signal may be received by or passed to interrupt controller 210. For example, interrupt controller 210 may have any number of input terminals (e.g., 24), each of which may be connected to a device (e.g., through an internal connector to a device within chipset 130, or through an internal connector to a pin or other terminal of chipset 130 to an external connector to a device external to chipset 130) that may generate an interrupt request, and interrupt controller 210 may include or have access to the same number (e.g., 24) of storage locations that may be programmed with or otherwise contain the information associated with each interrupt request, including a handle value.

For example, in an embodiment using where interrupt controller 210 is an I/O Advanced Programmable Interrupt Controller ("IO APIC") according to the architecture of the Intel® Pentium® Processor Family, the redirection table ("RT") register of the I/O APIC may be programmed as shown in FIG. 5 in order to generate interrupts that are compatible with an embodiment of the invention. In FIG. 5, RT entry 500 includes bit-fields 511, 512, 513, 514, 515, 516, 517, 518, and 519. Bit-field 511 includes bits 63:48 of RT entry 500, to indicate a 16-bit handle value. Bit-fields 512, 513, 514, 515, 516, and 517 include bits 16, 15, 14, 13, 12, and 11, respectively, of RT entry 500, to indicate mask, trigger mode, remote interrupt request register, interrupt input pin polarity, delivery status, and destination mode values, respectively, and provide the functionality of the known programming model. Bit-field 518 includes bits 10:8 of RT entry 500, to be set to logical '000' or '111' to indicate that the delivery mode is fixed or external, respectively. Bit-field 519 includes bits 7:0 of RT entry 500, to indicate an 8-bit interrupt vector.

Returning to look-up logic 220 of FIG. 2, in one embodiment look-up logic 220 may use a 16-bit handle from an MSI transaction or a 16-bit handle from an IO APIC to find an entry in a single level interrupt remapping table ("IRT") having 64K entries, each entry having 128 bits (each an "IRTE"). In another embodiment, where an MSI transaction includes an SHV that is set to a logical '1', or otherwise indicates that it includes a valid sub-handle, a 16-bit sub-handle from the transaction may be applied (e.g., logically or arithmetically combined with, as a mask or offset value) to a 16-bit handle from the transaction to form an effective handle, and the effective handle may be used by look-up logic 220 to find an IRTE. The value of the effective handle may be checked to ensure that it is directing look-up logic 220 to a location within the IRT. Other embodiments may use different sizes of handles, sub-handles, effective handles, and IRTs.

An IRT, or any other data structure to which look-up logic 220 refers, may be stored in system memory 140, or in any other storage area in system 100. In some embodiments, IRTEs may be cached in a storage area in remapping unit 132 or in any other area that is temporally or physically nearer to look-up logic 220 than the IRT. The base address of the IRT may be stored in IRT address register 222, or any other storage location accessible to look-up logic 220.

Figure 6:
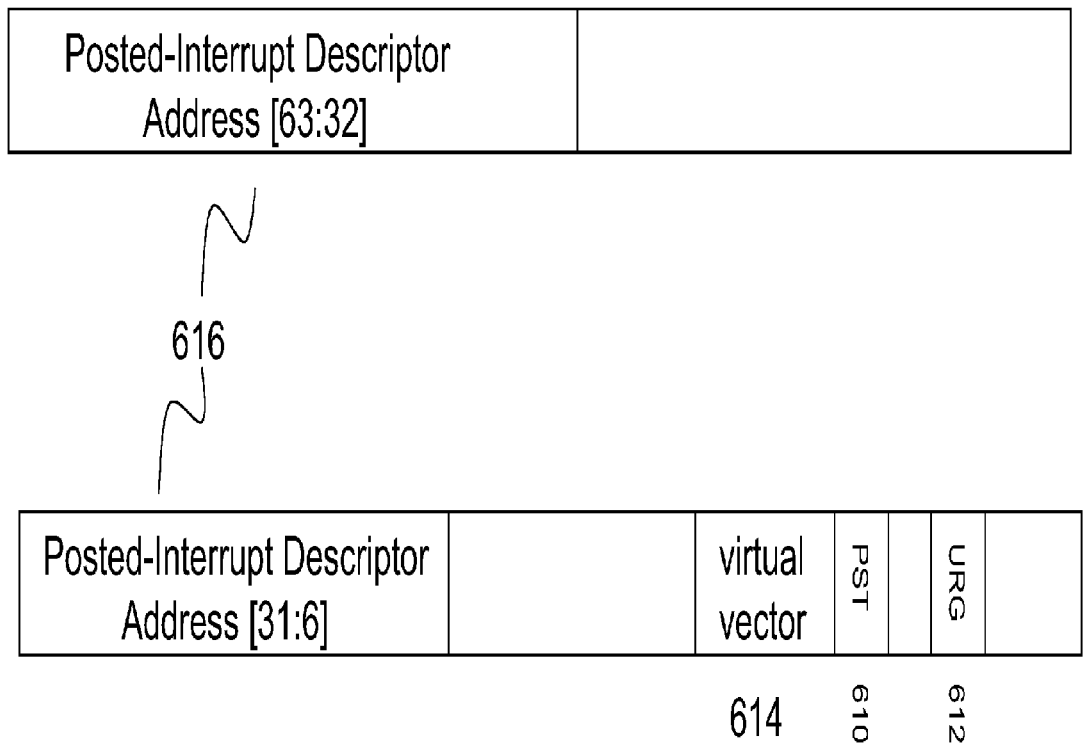
FIG. 6 illustrates an interrupt remapping table entry according to an embodiment of the present invention.

In one embodiment, each IRTE may have the format shown in FIG. 6. In FIG. 6, IRTE 600 includes bit-fields 610, 612, 614, and 616. Bit-field 610 may include bit 15 ("PST") to indicate whether the interrupt request directed to this IRTE is to be remapped or posted. For example, if this bit is clear (PST is '0'), then an interrupt request directed to this IRTE will be forwarded by routing logic 240 to a destination corresponding to a destination value in the IRTE, depending on the values of other bit-fields in the IRTE. For example, if a requestor identifier from the interrupt request does not match a source value in the IRTE, the interrupt request may be blocked. Routing logic 240 may also block the interrupt request based on other criteria.

However, in this embodiment, if this bit is set (PST is '1'), then an interrupt request directed to this IRTE will be posted by posting logic 250, as described below. If the IRTE is designated for posting (e.g., PST is '1'), then bit-fields 612, 614, and 616 are defined and used as set forth below, and the remaining bits of the IRTE may be treated as reserved or ignored. However, if the IRTE is designated for remapping (e.g., PST is '0'), then the entire IRTE is defined and used as according to the specified remapping protocol, which is not described here.

If the IRTE is designated for posting (e.g., PST is '1'), then bit-field 612, 614, and 616 may be defined and used as follows. Bit-field 612 may include bit 12 ("URG") to indicate is the interrupt request is urgent (i.e., time sensitive). The URG bit may be used to differentiate between interrupt requests that are urgent, such as from media devices, and interrupt requests that are more tolerant to interrupt processing latencies. Bit-field 614 ("Virtual Vector") may include bits 23:16 to indicate an eight bit virtual interrupt vector that is assigned to this interrupt request by the guest software running on the virtual processor that is the target of this interrupt request. Bit field 616 ("Posted-Interrupt Descriptor Address") may include bits 127:96 and 63:38 to indicate an address of a data structure for posting interrupts (a "posted-interrupt descriptor").

The posted-interrupt descriptor, or any other data structure to which the IRTE for a posted interrupt request refers, may be stored in system memory 140, or in any other storage area in system 100. In one embodiment, a posted-interrupt descriptor may be the size of a line of a cache accessible to processors 120 and 122, and the address may be aligned to a cache line. For example, a posted-interrupt descriptor may be 64 bytes, with an address having all zeroes in the six least significant bits, therefore bit-field 616 may be used to store bits 63:6 of an address in the address space of processors 120 and 122.

Figure 7:
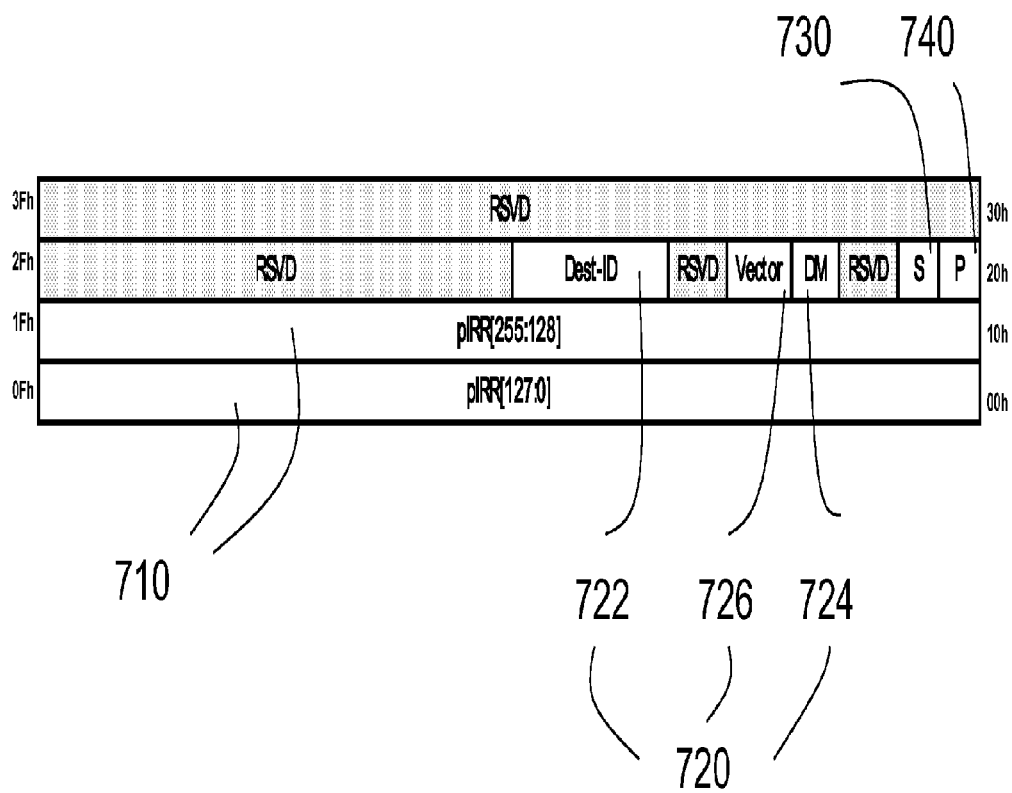
FIG. 7 illustrates a posted-interrupt descriptor according to an embodiment of the present invention.

Software, such as a VMM, may allocate a posted-interrupt descriptor for each virtual processor that may be the target of external interrupt requests. A posted-interrupt descriptor according to one embodiment of the present invention is illustrated in FIG. 7. Posted-interrupt descriptor 700 in FIG. 7 includes bit-fields 710, 720, 730, and 740.

Bit-field 710 may include the lowest 32 bytes of the 64-byte posted-interrupt descriptor to form a 256-bit posted interrupt request register ("pIRR"). Each bit of the pIRR may correspond to one of 256 virtual interrupt vectors for the virtual processor corresponding to the posted-interrupt descriptor. Each bit of the pIRR may be set to post an interrupt request for the corresponding virtual interrupt vector.

Bit-field 720 may include three smaller bit-fields to indicate attributes of a notify event to be used to inform a VMM of pending posted interrupts. In one embodiment, the event used to notify a VMM that posted interrupts are pending may be a physical interrupt request to a physical processor. Therefore, using a physical processor that may support over one hundred physical interrupts, embodiments of the present invention may provide for over one hundred virtual processors per physical processor.

Notify event attributes bit-field 720 may include bit-fields 722, 724, and 726. Bit-field 722 ("Dest-ID") may include 32 bits to identify the destination of the interrupt request, which, for example, may be the local APIC for the physical processor on which the virtual processor that is the target of the interrupt request is running. The physical processor to which the target virtual processor has temporal affinity may change as virtual processors are migrated, so this field may be reprogrammed, by the VMM, with a new local APIC identifier in connection with a migration for load balancing or any other reason. The physical processor to which a target virtual processor has temporal affinity at any given time may be called the "notify-CPU" in this description, as it will be the physical processor to which a notify event will be sent when there are pending posted interrupts for that virtual processor.

Bit-field 724 ("DM") may include a single bit to indicate the mode for the notify event. For example, in an embodiment where the notify event is a physical interrupt, DM may indicate whether the value of Dest-ID should be interpreted as a physical or a logical identifier ("ID"). Bit-field 726 ("Physical Vector") may include eight bits to indicate the physical vector to be used for the notify event. When a notify event is delivered to the VMM, the VMM may use the physical vector to determine which virtual processor has pending posted interrupts in its posted-interrupt descriptor. Therefore, embodiments of the present invention provide for a single physical vector per virtual processor, instead of a physical vector for each virtual interrupt.

Bit-field 730 ("Supress" or "S") may include one bit to store a suppress flag to indicate whether notify events are to be suppressed when posting interrupts to this posted-interrupt descriptor. Software, such as VMM, may set this bit at any time to suppress notify events, such as when the corresponding virtual processor is not running because it is in the scheduler wait queue, waiting for one of its quanta of time to run. Bit-field 740 ("Pending" or "P") may include one bit to store a pending flag to indicate whether there is a pending notify event for this posted-interrupt descriptor that has not been serviced yet. If this flag is already set at the time an interrupt request is posted, then there is no need to send another notify event. This flag may be set by hardware when it sends a notify event, and cleared by software as part of servicing the notify event.

Figure 8:
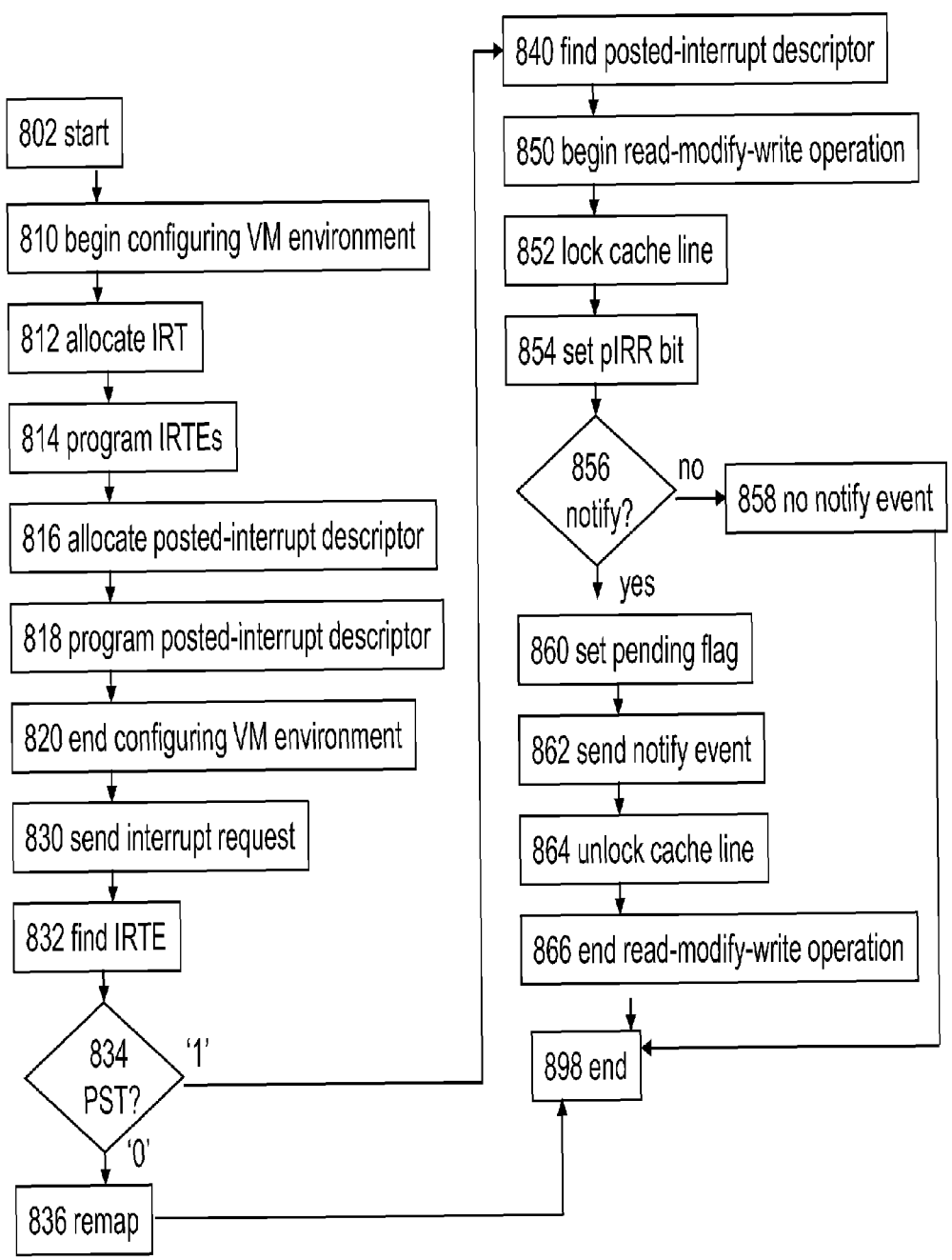
FIG. 8 illustrates an embodiment of the present invention in a method for posting interrupts to virtual processors.
Figure 9:
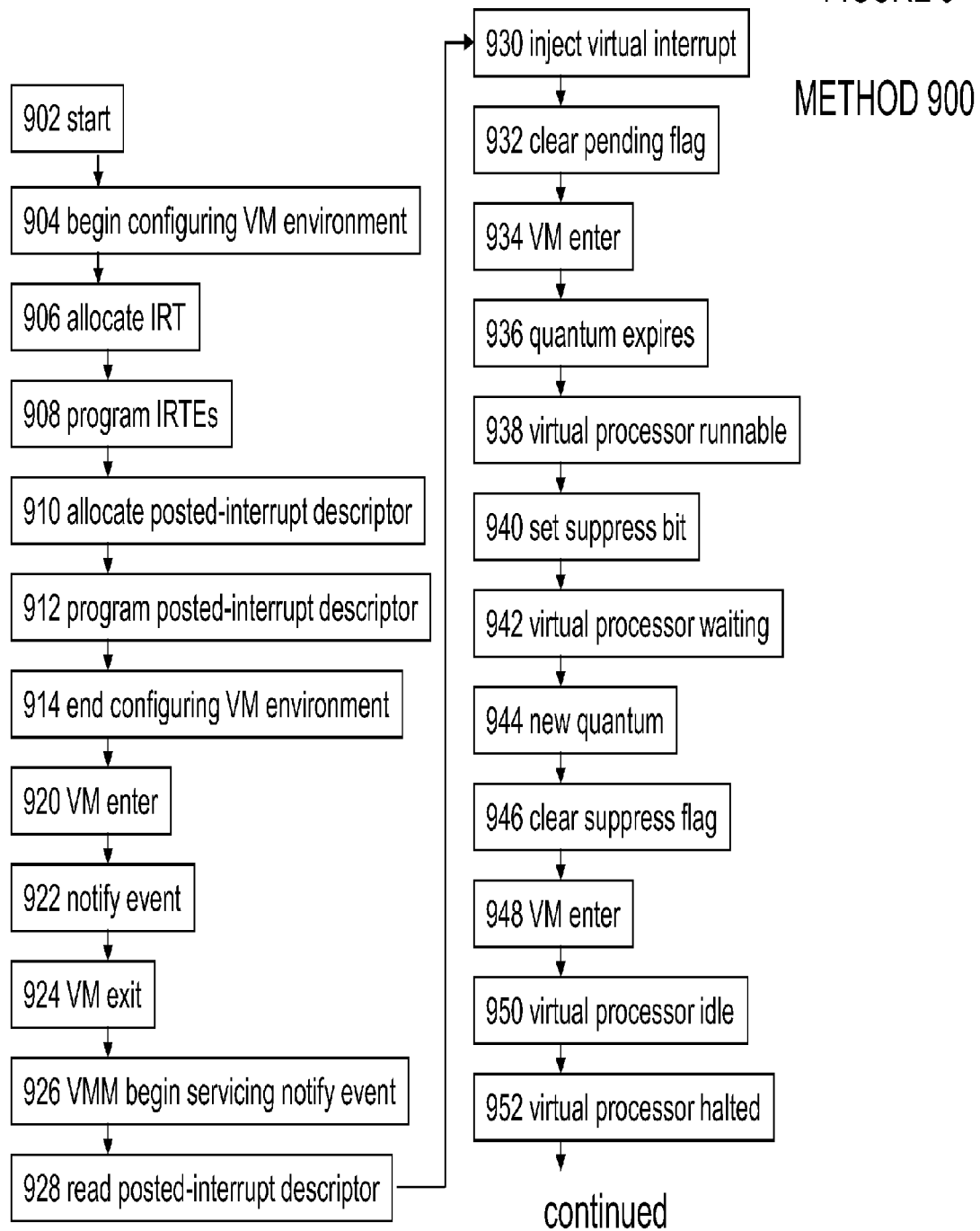
FIG. 9 illustrates an embodiment of the present invention in a method for managing posted interrupts.

FIGS. 8 and 9 illustrate embodiments of the present invention in methods, specifically methods 800 for posting interrupts to virtual processors and method 900 for managing posted interrupts. Although method embodiments are not limited in this respect, reference may be made to the elements in the system embodiment of FIG. 1 and the apparatus embodiment of FIG. 2 to describe the method embodiments of FIGS. 8 and 9.

In box 802 of FIG. 8, method 800 begins.

In box 810 of FIG. 8, software such as a VMM begins to configure system 100 to support a virtualization environment, including posting interrupts to virtual processors. In box 812, the VMM allocates a memory region for an IRT, for example by programming IRT address register 222 with the base address of a memory region for an IRT. In box 814, the VMM begins to set up the IRT by programming each IRTE, including setting the PST bit for each IRTE for which posting (e.g., instead of remapping) will be performed. In box 816, the VMM allocates a posted-interrupt descriptor for each virtual processor, for example by programming each IRTE for which posting will be performed with the address of a memory region for a posted-interrupt descriptor. In box 818, the VMM programs each posted-interrupt descriptor with the desired attributes and other information. In box 820, configuration of system 100 to support the virtualization environment, including programming of the IRT and posted-interrupt descriptors, ends.

In box 830, an interrupt request, including the handle, is sent to chipset 130. In box 832, look-up logic 220 uses the handle from the interrupt request to find an IRTE. In box 834, the value of the PST bit in the IRTE is determined. If the PST bit is clear, method 800 continues to box 836, where the interrupt is remapped and forwarded, by routing logic 230, to the destination specified in the IRTE. However, if the PST bit is set, method 700 continues to box 840.

In box 840, the Posted-Interrupt Descriptor Address from the IRTE is used, for example by posting logic 240, to find the Posted-Interrupt Descriptor for this IRTE.

In box 850, a read-modify-write operation, for example by posting logic 240, is begun on the Posted-Interrupt Descriptor. An atomic read-modify-write operation is used to allow access to the Posted-Interrupt Descriptor by multiple sources, such as multiple instances of posting logic 240, other interrupt posting hardware, and software such as a VMM. In box 852, the cache line storing the Posted-Interrupt Descriptor is locked. In box 854, the pIRR bit corresponding to the Virtual Vector from the IRTE is set (or, if already set, it remains set).

In box 856, it is determined whether to generate a notify event. In one embodiment, the determination is based on the values of the URG bit in the IRTE and the Pending and Suppress bits in the Posted-Interrupt Descriptor, as follows. If the URG bit is set (i.e., the interrupt request is urgent) or the Suppress flag is not set (i.e., the VMM has not temporarily suppressed interrupt requests to this virtual processor), and the Pending bit is not set (i.e., there is not already a notify event pending for this virtual processor), then method 800 continues to box 860, where a notify event will be sent. Otherwise, method 800 continues to box 858, where no notify event is sent.

In box 860, the Pending flag in this posted-interrupt descriptor is set. In box 862, a notify event is sent to the destination specified by the Dest-ID and DM fields of the posted-interrupt descriptor, using the value in the Physical Vector field. For example, an interrupt message may be sent to the local APIC specified by the Dest-ID and DM fields, the interrupt message including the vector from the Physical Vector field. In box 864, the cache line is unlocked. In box 866, the atomic read-modify-write operation, begun in box 850, ends.

In box 898, method 800 ends.

Turning to FIG. 9, method 900 is a method for managing posted interrupts according to an embodiment of the present invention. In box 902, method 900 begins.

In box 904, software such as a VMM begins to configure system 100 to support a virtualization environment, including posting interrupts to virtual processors. In box 906, the VMM allocates a memory region for an IRT, for example by programming IRT address register 222 with the base address of a memory region for an IRT. In box 908, the VMM begins to set up the IRT by programming each IRTE, including setting the PST bit for each IRTE for which posting (e.g., instead of remapping) will be performed. In box 910, the VMM allocates a posted-interrupt descriptor for each virtual processor, for example by programming each IRTE for which posting will be performed with the address of a memory region for a posted-interrupt descriptor.

In box 912, the VMM programs each posted-interrupt descriptor with the desired attributes and other information. For example, the Dest-ID field of a posted-interrupt descriptor for a virtual processor set up to run on processor 120 may be programmed with the ID of the local APIC for processor 120, the DM may be set to physical, and the Physical Vector field may be programmed with the vector to be used by processor 120 to service the physical interrupt used as the posted-interrupt notify event. In box 914, configuration of system 100 to support the virtualization environment, including programming of the IRT and posted-interrupt descriptors, ends.

In box 920, a virtual processor may begin to run on a physical processor, such as processor 120, in system 100. Therefore, the virtual processor is in an active state and its notify-CPU is processor 120. In box 922, a notify event for the virtual processor, for example a physical interrupt from box 862 of method 800, may be received by processor 120, causing a VM exit in box 924. In box 926, the VMM begin to service the physical interrupt, using the physical vector to identify the virtual processor for which the notify event was sent. In box 928, the VMM may read the posted-interrupt descriptor for the virtual processor to determine the virtual interrupt request that is pending, according to the pIRR. In box 930, the VMM may inject the virtual interrupt request into the virtual processor for servicing. In box 932, the VMM may clear the Pending flag in the posted-interrupt descriptor. In box 934, the virtual processor may be restarted on physical processor 120.

In box 936, the virtual processor's quantum may expire, so in box 938, the virtual processor may move into a runnable state. In box 940, the VMM may set the Suppress flag in the posted-interrupt descriptor, in order to prevent a virtual interrupt for the virtual processor from causing a VM exit while the virtual processor is in the runnable state. In box 942, the virtual processor may be waiting for the scheduler to activate it on its notify-CPU. In box 944, the next quantum for the virtual processor may arrive. Therefore, in box 946, the VMM may clear the Suppress flag that it set in box 940.

In box 948, the virtual processor may begin to run on processor 120. Therefore, the virtual processor is in an active state and its notify-CPU is processor 120, so in box In box 950, a guest running on the virtual processor may issue an instruction, such as a HLT or MWAIT instruction, to inform the VMM that it is idle, and give up its quantum of time. Therefore, in box 952, the virtual processor may move into a halted state.

In box 954, a notify event for the virtual processor, for example a physical interrupt from box 862 of method 800, may be received by processor 120. In box 956, the VMM begin to service the physical interrupt, using the physical vector to identify the virtual processor for which the notify event was sent. In box 958, the VMM may read the posted-interrupt descriptor for the virtual processor to determine the virtual interrupt request that is pending, according to the pIRR. In box 960, the VMM may inject the virtual interrupt request into the virtual processor for servicing. In box 962, the VMM may clear the Pending flag in the posted-interrupt descriptor. In box 964, the virtual processor may be restarted on physical processor 120.

In box 970, the VMM may desire to migrate the virtual processor from physical processor 120 to physical processor 122 for load balancing or any other reason. Therefore, in box 972, the VMM may cause a VM exit. In box 974, the VMM may begin migrating the virtual processor from physical processor 120 to physical processor 122.

In box 976, the VMM may reprogram the notify event attributes in the posted-interrupt descriptor for the virtual processor. For example, the Dest-ID field of the posted-interrupt descriptor may be reprogrammed with the ID of the local APIC for processor 122, and the Physical Vector field may be reprogrammed with the vector to be used by processor 122 to service the physical interrupt used as the posted-interrupt notify event. Therefore, embodiments of the present invention provide for migrating a virtual processor from one physical processor to another without reprogramming all of the virtual processor's IRTEs or other mapping information.

In box 978, the migration of the virtual processor from physical processor 120 to physical processor 122 may end. In box 980, the virtual processor may begin to run on physical processor 122.

In box 998, method 900 ends.

Within the scope of the present invention, methods 800 and 900 may be performed with illustrated boxes omitted, with additional boxes added, or with a combination of reordered, omitted, or additional boxes.

Thus, systems, apparatuses, and methods for posting interrupts to virtual processors have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A system comprising:
   a first physical processor to support a virtualization environment to run a virtual processor;
   a device to generate an interrupt request to the virtual processor;
   look-up logic to look up an entry associated with an interrupt request to the virtual processor in a first data structure;

posting logic to post the interrupt request in a second data structure specified by first information in the first data structure and to generate a notify event to the first physical processor, the second data structure to include an identifier of the first physical processor, the notify event to indicate that an interrupt request is posted for the virtual processor; and a memory to store the first data structure and the second data structure.

2. The system of claim 1, wherein the first information includes the address of the second data structure.

3. The system of claim 1, wherein the second data structure is to include a plurality of posted-interrupt request indicators, each of the plurality of posted-interrupt request indicators corresponding to one of a plurality of virtual interrupt vectors associated with the virtual processor.

4. The system of claim 1, wherein the notify event is an interrupt request to the first physical processor.

5. The system of claim 4, wherein the second data structure is to include a physical interrupt vector to be included in an interrupt message to the first physical processor.

6. The system of claim 1, wherein the posting logic is to use second information from the second data structure to determine whether to generate the notify event.

7. The system of claim 6, wherein the second information includes an indication of whether a previous interrupt request to the virtual processor is pending.

8. The system of claim 6, wherein the second information includes an indication of whether the notify event is suppressed.

9. The system of claim 1, further comprising migrating a second physical processor to which to migrate the virtual processor, wherein the second data structure is also to include an identifier of the second physical processor.

* * * * *